(12) United States Patent
Tazuke et al.

(10) Patent No.: US 11,613,110 B2
(45) Date of Patent: Mar. 28, 2023

(54) LAMINATE

(71) Applicant: FURUKAWA ELECTRIC CO., LTD., Tokyo (JP)

(72) Inventors: Masami Tazuke, Tokyo (JP); Toshihiro Suzuki, Tokyo (JP); Hidekazu Hara, Tokyo (JP); Jirou Hiroishi, Tokyo (JP); Jae Kyung Kim, Tokyo (JP); Masato Ikeuchi, Tokyo (JP); Jiro Sakato, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/226,257

(22) Filed: Apr. 9, 2021

(65) Prior Publication Data
US 2021/0245482 A1  Aug. 12, 2021

Related U.S. Application Data

(63) Continuation of application No. PCT/JP2019/047435, filed on Dec. 4, 2019.

(30) Foreign Application Priority Data

Dec. 5, 2018 (JP) .............................. JP2018-228580
May 27, 2019 (JP) .............................. JP2019-098911

(51) Int. Cl.

| | | |
|---|---|---|
| B32B 27/20 | (2006.01) | |
| B29B 7/90 | (2006.01) | |
| B29C 49/00 | (2006.01) | |
| B29C 49/04 | (2006.01) | |
| B29C 49/22 | (2006.01) | |
| B32B 1/08 | (2006.01) | |
| B32B 3/28 | (2006.01) | |
| B32B 5/18 | (2006.01) | |
| B32B 27/08 | (2006.01) | |
| B32B 27/32 | (2006.01) | |
| C08K 3/04 | (2006.01) | |
| C08L 23/06 | (2006.01) | |
| F16L 11/08 | (2006.01) | |
| F16L 11/112 | (2006.01) | |
| B29K 401/00 | (2006.01) | |
| B29K 505/02 | (2006.01) | |
| B29L 23/00 | (2006.01) | |

(52) U.S. Cl.
CPC ............. *B32B 27/20* (2013.01); *B29B 7/90* (2013.01); *B29C 49/0005* (2013.01); *B29C 49/04* (2013.01); *B29C 49/22* (2013.01); *B32B 1/08* (2013.01); *B32B 3/28* (2013.01); *B32B 5/18* (2013.01); *B32B 27/08* (2013.01); *B32B 27/32* (2013.01); *C08K 3/04* (2013.01); *C08L 23/06* (2013.01); *F16L 11/08* (2013.01); *F16L 11/112* (2013.01); *B29K 2401/00* (2013.01); *B29K 2505/02* (2013.01); *B29L 2023/22* (2013.01); *B32B 2262/062* (2013.01); *B32B 2264/1052* (2020.08); *B32B 2264/201* (2020.08); *B32B 2597/00* (2013.01); *C08L 2205/16* (2013.01); *C08L 2207/066* (2013.01)

(58) Field of Classification Search
CPC ............... B23B 27/20; B23B 2597/00; B23B 2262/062; B23B 2264/1052; B23B 2264/201; B23B 27/32; B23B 27/08; B23B 5/18; B23B 3/28; B23B 1/08; C08L 2207/066; C08L 2205/16; C08L 23/06; F16L 11/112; C08K 3/04; B29B 7/90

See application file for complete search history.

(56) References Cited

U.S. PATENT DOCUMENTS

| | | | |
|---|---|---|---|
| 4,533,446 A | 8/1985 | Conway et al. | |
| 2005/0186373 A1* | 8/2005 | Rhee ...................... | B32B 27/08 428/36.9 |
| 2012/0219746 A1 | 8/2012 | Powell | |

FOREIGN PATENT DOCUMENTS

| | | | |
|---|---|---|---|
| AU | 6669900 A1 | 5/2001 | |
| CN | 1301628 A | 7/2001 | |
| EP | 1 974 905 A1 | 10/2008 | |
| EP | 3441425 A1 | 2/2019 | |
| EP | 3 892 434 A1 | 10/2021 | |
| JP | 60-40177 A | 3/1985 | |
| JP | 1-314643 A | 12/1989 | |
| JP | 2001-315746 A | 11/2001 | |
| JP | 2007-168163 A | 7/2007 | |
| JP | 2010-280138 A | 12/2010 | |
| JP | 2011-195691 A | 10/2011 | |
| JP | 2016-191183 A | 11/2016 | |
| JP | 2017-145392 A | 8/2017 | |
| JP | 2018-145279 A | 9/2018 | |
| JP | 2019-136911 A | 8/2019 | |
| WO | WO 2018/105174 A1 | 6/2018 | |

OTHER PUBLICATIONS

International Search Report, issued in PCT/JP2019/047435, PCT/ISA/210, dated Mar. 10, 2020.
Chinese Office Action and Search Report for corresponding Chinese Application No. 201980062268.9, dated Jun. 17, 2022, with English translation.
Extended European Search Report for corresponding European Application No. 19892098.5, dated Aug. 1, 2022.

* cited by examiner

*Primary Examiner* — Ellen S Hock
(74) *Attorney, Agent, or Firm* — Birch, Stewart, Kolasch & Birch, LLP

(57) ABSTRACT

A laminate, containing two or more polyolefin resin layers, wherein at least one polyolefin resin layer (A) contains a cellulose fiber including a cellulose fiber having a fiber length of 0.3 mm or more dispersed in the layer; a content of the cellulose fiber in the polyolefin resin layer (A) is 1% by mass or more and less than 60% by mass; and wherein a polyolefin resin layer (B) different from the polyolefin resin layer (A) is laminated in contact with the polyolefin resin layer (A).

19 Claims, No Drawings

LAMINATE

CROSS-REFERENCE TO RELATED APPLICATIONS

This application is a Continuation of PCT International Application No. PCT/JP2019/047435 filed on Dec. 4, 2019, which claims priority under 35 U.S.C. § 119 (a) to Japanese Patent Application No. 2018-228580 filed in Japan on Dec. 5, 2018 and Japanese Patent Application No. 2019-098911 filed in Japan on May 27, 2019. Each of the above applications is hereby expressly incorporated by reference, in its entirely, into the present application.

TECHNICAL FIELD

The present invention relates to a laminate using a polyolefin resin material.

BACKGROUND ART

In order to improve mechanical properties of resin products, fiber-reinforced resins formed by blending reinforcing fibers such as glass fiber, carbon fiber, and cellulose fiber in a resin have been known.

When glass fiber is used as the reinforcing fiber, the glass fiber, which is an incombustible inorganic substance, remains in a large amount as ash even when being burnt by thermal recycling or the like, and thus has a problem in energy recovery rate in recycling. Further, the specific gravity of the glass fiber is larger than that of resin, and thus there is also a problem that the weight of the fiber-reinforced resin increases. Moreover, the glass fiber has a larger heat capacity than that of the resin, and thus requires time for cooling and solidifying after being formed, which restricts improvement in the production efficiency of a resin product.

Meanwhile, using carbon fiber as the reinforcing fiber in place of the glass fiber can solve the above problems. However, the carbon fiber is expensive, and thus there is a problem that use of the carbon fiber as the reinforcing fiber increases the cost of resin products.

On the other hand, a cellulose fiber, which is light weight and leaves less combustion residues in thermal recycling or the like, and is also relatively inexpensive, is advantageous in reduction in weight, recycling property, cost and the like. Techniques related to fiber-reinforced resins using a cellulose fiber have been reported. For example, Patent Literature 1 describes a container having an opening for charging contents, in which a container body is formed from a composite material obtained by kneading pulp along with resin. Patent Literature 1 describes that the container body includes an inner layer or an outer layer formed from resin on the inner side or outer side thereof.

CITATION LIST

Patent Literature

Patent Literature 1: JP-A-2001-315746 ("JP-A" means unexamined published Japanese patent application)

SUMMARY OF INVENTION

Technical Problem

However, when a composite material is formed by kneading a polyolefin resin and a cellulose fiber, a problem of the formability of the composite material tends to occur. For example, when a parison is formed by extrusion molding, blow molding, or the like, there is a case where the parison is not stretched well, as a result of which the thickness of a formed article is unstable or forming defects such as perforation occur. Further, gum tends to occur, and the appearance of the formed article tends to be impaired.

The present invention provides a laminate that includes a polyolefin resin layer formed by dispersing a cellulose fiber, is less likely to cause forming defects in the production thereof, and also has excellent mechanical properties.

Solution to Problem

The above problems of the present invention have been solved by the following means.

[1]

A laminate, containing two or more polyolefin resin layers, wherein at least one polyolefin resin layer (A) contains a cellulose fiber including a cellulose fiber having a fiber length of 0.3 mm or more dispersed in the layer; a content of the cellulose fiber in the polyolefin resin layer (A) is 1% by mass or more and less than 60% by mass; and wherein a polyolefin resin layer (B) different from the polyolefin resin layer (A) is laminated in contact with the polyolefin resin layer (A).

[2]

The laminate described in the above item [1], wherein the polyolefin resin layer (A) contains dispersed aluminum.

[3]

The laminate described in the above item [2], wherein the aluminum has a flake structure and/or an irregular folded structure of a thin film.

[4]

The laminate described in any one of the above items [1] to [3], which has a linear expansion coefficient of $1 \times 10^{-4}$/° C. or less in a temperature range of 20 to 30° C. in a direction perpendicular to a laminate direction of the laminate.

[5]

The laminate described in any one of the above items [1] to [4], wherein a polyolefin constituting the polyolefin resin layer (A) contains a low density polyethylene and/or a polyolefin having a melting point of 100 to 127° C.

[6]

The laminate described in any one of the above items [1] to [5], wherein a polyolefin resin constituting the polyolefin resin layer (B) contains a high density polyolefin resin.

[7]

The laminate described in any one of the above items [1] to [6], wherein the polyolefin resin layer (B) contains an inorganic material.

[8]

The laminate described in the above item [7], wherein a ratio of a linear expansion coefficient in a temperature range of 20 to 30° C. of the polyolefin resin layer (B) to a linear expansion coefficient in a temperature range of 20 to 30° C. of the polyolefin resin layer (A) is 1/3 to 3/1.

[9]

The laminate described in any one of the above items [1] to [8], wherein the polyolefin resin layer (A) contains at least one type of compound selected from a metal salt of organic acid, organic acid, and silicone.

[10]

The laminate described in any one of the above items [1] to [9], wherein the polyolefin resin layer (A) contains an inorganic material.

[11]

The laminate described in any one of the above items [1] to [10], containing the polyolefin resin layers (B) on both surfaces of the polyolefin resin layer (A), the polyolefin resin layers (B) being in contact with the polyolefin resin layer (A).

[12]

The laminate described in any one of the above items [1] to [10], wherein the laminate is an annular structure; and wherein the laminate includes the polyolefin resin layer (B) on an outer circumference and/or an inner circumference of the polyolefin resin layer (A) having an annular shape, the polyolefin resin layer (B) being in contact with the polyolefin resin layer (A).

[13]

The laminate described in the above item [11] or [12], wherein the laminate is an annular structure; and wherein the laminate includes the polyolefin resin layers (B) on an outer circumference and an inner circumference of the polyolefin resin layer (A) having an annular shape, the polyolefin resin layers (B) being in contact with the polyolefin resin layer (A).

[14]

The laminate described in any one of the above items [1] to [10],
wherein the laminate is an annular structure;
wherein the laminate includes the polyolefin resin layer (B) on at least an outer circumference of the polyolefin resin layer (A) having an annular shape, the polyolefin resin layer (B) being in contact with the polyolefin resin layer (A); and
wherein the polyolefin resin layer (B) contains at least one type of carbon black, a photostabilizer, and an inorganic powder having a refractive index of 2 or more.

[15]

The laminate described in any one of the above items [12] to [14], wherein the laminate having an annular structure is a corrugated tube which is corrugated in a longitudinal direction.

[16]

The laminate described in any one of the above items [1] to [15], wherein the laminate is an extrusion molded body or a blow molded body.

[17]

The laminate described in any one of the above items [1] to [16],
wherein the polyolefin resin layer (A) has a cross section of a foam having a foam diameter of 10 μm or more in cross-sectional observation of the polyolefin resin layer (A); and
wherein a proportion of a total area of the cross section of the foam in an area of an observed cross section is 5 to 70%.

[18]

The laminate described in any one of the above items [1] to [17], wherein a length weighted average fiber length of the cellulose fiber contained in the polyolefin resin layer (A) is 300 to 10,000 μm.

[19] The laminate described in any one of the above items [1] to [18], which is used as a member for civil engineering, a building material, or an automobile.

In the present invention, the numerical range expressed by using the expression "to" means a range including numerical values before and after the expression "to" as the lower limit and the upper limit.

Advantageous Effects of Invention

The laminate of the present invention includes a polyolefin resin layer formed by dispersing a cellulose fiber, is less likely to cause forming defects in the production thereof, and also has excellent mechanical properties.

DESCRIPTION OF EMBODIMENTS

Preferable embodiments of the laminate of the present invention will be described.

The laminate of the present invention includes two or more polyolefin resin layers, and at least one polyolefin resin layer (hereinafter, also referred to as "polyolefin resin layer (A)" or "layer (A)") is formed of a composite material formed by dispersing a cellulose fiber in a polyolefin resin (hereinafter, also simply referred to as "composite material"). Further, this cellulose fiber contains a cellulose fiber having a fiber length of 0.3 mm or more, and the content of the cellulose fiber in the layer (A) (100% by mass) is 1% by mass or more and less than 60% by mass.

Further, the laminate of the present invention includes a polyolefin resin layer which is in contact with the layer (A) and different from the layer (A) (hereinafter, also referred to as "polyolefin resin layer (B)" or "layer (B)"). Here, the expression "layer (A) and layer (B) are different" includes a form in which the types of polyolefin resins contained in the layers (A) and (B) are the same, as well as a form in which the types of polyolefin resins contained in the layers (A) and (B) are different. In other words, when the types of polyolefin resins contained in the layers (A) and (B) are the same, but the compositions of other components are different, the form of the layers (A) and (B) is different.

Also, when the laminate of the present invention has two or more layers (A), the composition or layer thickness of each of a plurality of layers (A) may be the same or different. The same applies to a form in which the laminate of the present invention has two or more layers (B).

[Polyolefin Resin Layer (A)]

The layer (A) is formed by using the above composite material. Hereinafter, the composition of the components of the composite material, the physical properties of each component, and the like will be described, but these descriptions are all applied to the composition of the components, the physical properties of each component, and the like of the layer (A) in the laminate of the present invention.

The composite material contains a cellulose fiber having a fiber length of 0.3 mm or more. The proportion of the cellulose fiber having a fiber length of 0.3 mm or more in the cellulose fiber in the composite material is preferably 20% by mass or more, more preferably 50% by mass or more, and even more preferably 70% by mass or more.

Also, from the viewpoint of further improving mechanical strength, the cellulose fiber in the composite material preferably contains 10% by mass or more of a cellulose fiber having a fiber length of 0.5 mm or more, more preferably 5% by mass or more of a cellulose fiber having a fiber length of 0.8 mm or more, and even more preferably 1% by mass or more of a cellulose fiber having a fiber length of 1 mm or more.

The fiber length of the cellulose fiber in the composite material can be measured by observing, with a microscope, a dissolution residue (insoluble component) obtained by immersing a composite material into a solvent capable of dissolving a resin in the composite material. As a solvent capable of dissolving a polyolefin resin, hot xylene (130 to 150° C.) is suitable. A more specific measurement method will be described in the examples described later.

The fiber length of the cellulose fiber in the composite material can also be obtained from the distribution data of the fiber obtained by performing measurement for a dissolution residue (insoluble component) obtained by immersing the composite material in a solvent capable of dissolving the resin in the composite material in accordance with Pulps-Determination of fibre length by automated optical analysis specified by ISO 16065 2001 (JIS P8226 2006).

The length weighted average fiber length of the cellulose fiber in the composite material is preferably 0.3 mm (300 µm) or more. Mechanical strength such as flexural strength can be further improved by adjusting the length weighted average fiber length to 300 µm or more. The length weighted average fiber length of the cellulose fiber is determined for a dissolution residue (insoluble component) obtained by immersing the composite material into a solvent capable of dissolving the resin in the composite material in accordance with Pulps-Determination of fibre length by automated optical analysis specified by ISO 16065 2001 (JIS P8226 2006). The length weighted average fiber length is a value obtained by dividing the sum of the squares of the fiber lengths of respective measured fibers by the total of the fiber lengths of respective measured fibers. As the characteristics of this average, the influence of the fiber length of the fiber having a longer fiber length, and the influence of the probability density of the fiber having a longer fiber length than the number average fiber length are remarkable compared to the number average fiber length which is a simple average of the fiber lengths. For this reason, the length weighted average fiber length is more suitable for evaluating the influence of the composite material containing a fiber having a long fiber length contained in the composite material on the mechanical properties than the number average fiber length.

The length weighted average fiber length of the cellulose fiber contained in the composite material is preferably 300 to 10,000 µm. From the viewpoint of further improving mechanical strength such as the flexural strength of the composite material, the length weighted average fiber length of the cellulose fiber is more preferably 400 µm or more, and even more preferably 500 µm or more. The average fiber diameter of the cellulose fiber in the composite material is preferably 5 to 40 µm. The mechanical strength of the obtained formed body can be further improved by the cellulose fiber having the above fiber length and the above fiber diameter. Further, pretreatment of the cellulose material is eliminated, and a load on the later-described treatment in preparation of the composite material can also be reduced by adjusting the average fiber diameter of the cellulose fiber to 5 µm or more. Moreover, even when the formed body has a thin portion, satisfactory formability can be obtained by adjusting the average fiber diameter of the cellulose fiber to 40µ or less. The average fiber diameter of the cellulose fiber in the composite material is preferably 10 to 30 µm.

The content of the cellulose fiber in the composite material (100% by mass) is 1% by mass or more and less than 60% by mass. The mechanical strength of the obtained laminate can be further improved by adjusting the content of the cellulose fiber in the composite material to 1% by mass or more. From this point of view, the content of the cellulose fiber in the composite material is more preferably 2% by mass or more, even more preferably 3% by mass or more, even more preferably 5% by mass or more, and even more preferably 10% by mass or more.

Further, the dispersion state of the cellulose fiber in the composite material can be further uniformized by adjusting the content of the cellulose fiber in the composite material to less than 60% by mass. From the viewpoint of further suppressing water absorbing properties, the content of the cellulose fiber in the composite material is preferably less than 50% by mass, also preferably less than 40 by mass, and also preferably less than 30% by mass.

The content of the cellulose fiber contained in the composite material (% by mass) is determined by employing a value obtained by a thermogravimetric analysis as follows.

<Method of Determining Content of Cellulose Fiber (Cellulose Effective Mass Ratio)>

A composite material sample (10 mg) which has been dried in advance under the atmosphere at 80° C. for 1 hour is subjected to a thermogravimetric analysis (TGA) from 23° C. to 400° C. under a nitrogen atmosphere at a heating rate of +10° C./min. Then, the content of cellulose fiber (% by mass, also referred to as cellulose effective mass ratio) is calculated by the following [Formula I].

(content of cellulose fiber [% by mass])=(amount of mass reduction of composite material sample at 200 to 380° C. [mg])×100/(mass of composite material sample in dried state before thermogravimetric analysis [mg])  [Formula I]

Incidentally, when the temperature is raised to 200 to 380° C. under a nitrogen atmosphere at a heating rate of +10° C./min, almost all of the cellulose fiber is thermally decomposed and lost. In the present invention, the % by mass calculated by the above [Formula I] is taken as the content of the cellulose fiber contained in the composite material.

The polyolefin resin constituting the composite material is preferably a polyethylene resin and a polypropylene resin, or preferably a mixture of a polyethylene resin and a polypropylene resin (resin blend). Further, ethylene-based copolymers such as an ethylene-vinyl acetate copolymer, an ethylene-ethyl acrylate copolymer, an ethylene-methyl methacrylate copolymer, an ethylene-acrylic acid copolymer, an ethylene-methacrylic acid copolymer, an ethylene-glycidyl methacrylate copolymer, and an ethylene-propylene copolymer (copolymers containing ethylene as a constituent); and resins such as polybutene are preferable as the polyolefin resin used in the composite material of the present invention. One type of polyolefin resin may be used singly, or two or more types thereof may be used in combination. The polyolefin resin constituting the composite material of the present invention is preferably a polyethylene resin and/or a polypropylene resin, and more preferably a polyethylene resin.

Examples of the above polyethylene include low density polyethylenes (LDPE) and high density polyethylenes (HDPE). The resin constituting the composite material of the present invention is preferably a polyolefin resin, and this polyolefin is preferably a polyethylene.

The above low density polyethylene means a polyethylene having a density of 880 kg/m$^3$ or more and less than 940 kg/m$^3$. The above high density polyethylene means a polyethylene having a density larger than the density of the above low density polyethylene.

The low density polyethylene may be so-called "low density polyethylene" and "ultralow density polyethylene" each having long chain branching, or linear low density polyethylene (LLDPE) in which ethylene and a small amount of α-olefin monomer are copolymerized, or further may be "ethylene-α-olefin copolymer elastomer" involved in the above density range.

The low density polyethylene has a low softening temperature and allows kneading and forming in a lower temperature range. The low density polyethylene thus can suppress deterioration of the cellulose fiber in the composite material, and also suppress generation of vaporized matters such as water vapor which can be generated from the fiber.

The polyolefin resin constituting the composite material preferably contains a low density polyethylene and/or a polyolefin resin having a melting point of 100 to 127° C., and more preferably is a low density polyethylene and/or a polyolefin resin having a melting point of 100 to 127° C. The "polyolefin resin having a melting point of 100 to 127° C." does not include the low density polyethylene. The melting point is determined by using differential scanning calorimetry (DSC) in accordance with JIS K7121.

In consideration of simultaneously forming the layers (A) and (B), the polyolefin resin constituting the layer (B) also preferably contains a low density polyethylene and/or a polyolefin resin having a melting point of 100 to 127° C., and, more preferably is a low density polyethylene and/or a polyolefin resin having a melting point of 100 to 127° C.

Also, from the viewpoint of the strength of the laminate, the polyolefin resin constituting the layer (B) also preferably contains a high density polyethylene and/or a polypropylene.

In terms of formability and strength, the polyolefin resin constituting the layer (B) particularly preferably contains a high density polyethylene, and, also preferably is a high density polyethylene resin.

The content of the polyolefin resin in the composite material is preferably 40% by mass or more, preferably 50% by mass or more, even more preferably 60% by mass or more, and also preferably 70% by mass or more. Further, the content of the polyolefin resin in the composite material of the present invention is ordinarily less than 99% by mass, preferably less than 98% by mass, more preferably less than 97% by mass, and also preferably less than 96% by mass.

Incidentally, when the total content of the cellulose fiber and the polyolefin resin in the composite material is less than 100% by mass, the remainder can contain, for example, later-described components and the like as appropriate according to the purpose or raw materials to be used.

The composite material is also preferably in a form in which aluminum is dispersed in the resin in addition to the cellulose fiber (individual dispersed aluminums are also referred to as an aluminum dispersoid). Thermal conductivity is improved, and lubricity can also be improved by the composite material containing aluminum. Further, even when laminates are placed in a state of being stacked in a manner that the layer (A) is an outermost surface, the formed bodies are hard to be closely adhered to each other, and thus are easy to be peeled. From the viewpoint of effectively exhibiting such effects of aluminum, aluminum in the composite material preferably has a flake structure and/or an irregular folded structure of a thin film. The shape of the aluminum in the composite material may be a flake structure such a scale shape, and further, may be a form in which at least a part of such a flake structure is bent, namely, a form in which at least a part of a thin film is bent, or further a form in which a part of aluminum is a flake structure and/or a form in which a thin film is folded.

When the composite material is in a form in which aluminum is dispersed, the content of the aluminum is preferably 1% by mass or more and 30% by mass or less in the composite material. A lump of aluminum becomes harder to be formed during the forming process of the composite material by containing aluminum in such a content.

When the composite material contains aluminum, this aluminum preferably contains an aluminum dispersoid having an X-Y maximum length of 0.005 mm or more. The proportion of the number of aluminum dispersoids having an X-Y maximum length of 1 mm or more in the number of aluminum dispersoids having an X-Y maximum length of 0.005 mm or more is preferably less than 1%. The processability of the composite material can be further improved by adjusting this proportion to a level less than 1%, the lump of aluminum becomes harder to be formed during processing of the composite material.

The above X-Y maximum length is determined by observing the cross section or surface of a layer formed by using the composite material (for example, the layer (A)). Specifically, in this observation surface, a longer length of an X-axis maximum length and a Y-axis maximum length is taken as the X-Y maximum length by randomly drawing a straight line in a specific direction (X-axis direction) relative to the aluminum dispersoid to measure the maximum distance (X-axis maximum length) in which a distance connecting lines between two intersection points where the straight line intersects with an outer periphery of the aluminum becomes maximum, and drawing another straight line in a direction (Y-axis direction) perpendicular to the specific direction to measure the maximum distance (Y-axis maximum length) connecting lines between the two intersection points where the Y-axis direction line intersects with the outer periphery of the aluminum becomes maximum. The X-Y maximum length can be determined by using image analysis software.

In the aluminum dispersoid dispersed in the composite material in the present invention, the average of the X-Y maximum length is preferably 0.02 to 0.2 mm, and more preferably 0.04 to 0.1 mm. The average of the X-Y maximum length is taken as the average of the X-Y maximum length measured by using image analysis software.

The content of the polyolefin resin (% by mass) and the content of the aluminum (% by mass) in the composite material can be determined as follows.

The content of the polyolefin resin in the composite material (% by mass) can be determined as hot xylene dissolution mass ratio Ga (% by mass) by the following Formula.

$$Ga[\% \text{ by mass}] = \{(W0 - Wa)/W0\} \times 100$$

W0: dry mass of a composite material before being immersed into hot xylene

Wa: mass of a composite material after a composite material is immersed into hot xylene at 138° C. to dissolve a polyolefin resin in the composite material in the hot xylene, the composite material is then taken out, and xylene is dried and removed.

Here, the condition for the above Wa will be specifically described. In accordance with measurement of a degree of crosslinking in JASO D 618 as the standard for automotive electrical cables, 0.1 to 1 g is cut out from a formed sheet of the composite material and taken as a sample, and this sample is wrapped with a 400-mesh stainless steel mesh, and immersed into 100 mL of xylene at a predetermined temperature for 24 hours. Next, the sample was pulled up therefrom, and then the sample was dried in vacuum at 80° C. for 24 hours. The mass after drying is the above Wa.

When the composite material is formed of a polyolefin resin, a cellulose fiber, and other components such as aluminum, the content of the other components such as aluminum in the composite material (% by mass) is expressed as follows.

Content of other components such as aluminum (% by mass)=100−{(content of cellulose fiber (% by mass)+content of polyolefin resin (% by mass)}

The composite material may contain a resin component other than the polyolefin resin. The composite material of the present invention may contain polyethylene terephthalate and/or nylon, for example. In this case, it is preferable that the composite material contains polyethylene terephthalate and/or nylon, and the total content of polyethylene terephthalate and/or nylon is 10 parts by mass or less based on the total content of 100 parts by mass of the polyolefin resin and the cellulose fiber. When a polyethylene resin is used as the polyolefin resin, it is preferable that the composite material contains polyethylene terephthalate and/or nylon, and a total content of polyethylene terephthalate and/or nylon is 10 parts by mass or less based on the total content of 100 parts by mass of the polyethylene resin and the cellulose fiber. Here, "the total content of polyethylene terephthalate and/or nylon" means the content of one type when the composite material contains either polyethylene terephthalate or nylon, or means the total content of polyethylene terephthalate and nylon when the composite material contains both polyethylene terephthalate and nylon.

At least a part of the polyolefin resin and cellulose fiber constituting the composite material is preferably derived from a recycled material. Further, at least a part of the aluminum, polyethylene terephthalate, and/or nylon, which can be contained in the composite material of the present invention, is preferably derived from a recycled material. The production cost of the composite material can be suppressed by utilizing the recycled material.

Examples of the recycled material include polyolefin laminated paper having paper and a polyolefin thin film layer, polyolefin laminated paper having paper, a polyolefin thin film layer, and an aluminum thin film layer, and a beverage pack and/or food pack made of these processed papers.

More preferably, it is preferable to use a polyolefin thin film piece to which the cellulose fiber is adhered, obtained by processing the above laminated paper and/or beverage/food pack by a pulper to strip off and remove a paper portion (hereinafter, referred to as "cellulose fiber-adhering polyolefin thin film piece") as the recycled material. When the laminated paper and/or the beverage/food pack have an aluminum thin film layer, aluminum is also adhered to the cellulose fiber-adhering polyolefin thin film piece.

In addition to these materials, examples of the recycled material used as the cellulose material include waste paper of office paper, cardboard, and the like, paper powder, regenerated pulp, and paper sludge. Examples of the recycled material used as the polyolefin resin include recovered materials and production loss materials of a packaging container, a packaging film, a laminated film, and the like.

In the composite material, the moisture content is preferably less than 1% by mass. The moisture content is determined from the weight loss (% by mass) when 10 mg of composite material sample is subjected to a thermogravimetric analysis (TGA) from 23° C. to 120° C. at a heating rate of +10° C./min under a nitrogen atmosphere within 6 hours after production of the composite material.

The composite material may contain at least one type of compound of a metal salt of organic acid, organic acid, and silicone. A composite material containing these compounds improves flowability during heating and forming, and further prevents occurrence of forming defects during forming. Preferred examples of the compound include metal salts of fatty acids such as zinc stearate and sodium stearate, and fatty acids such as oleic acid and stearic acid.

The composite material may contain an inorganic material (preferably, inorganic powder). Flexural modulus, impact resistance, and flame retardancy can be improved by containing the inorganic material. Examples of the inorganic material include calcium carbonate, talc, clay, magnesium oxide, aluminum hydroxide, magnesium hydroxide, and titanium oxide.

The composite material may contain a flame retardant, an antioxidant, a stabilizer, a weathering agent, a compatibilizer, an impact improver, a modifier, or the like according to the purpose. The composite material of the present invention can contain an oil component or various types of additives for improving processability. Examples thereof include paraffin, modified polyethylene wax, stearate, hydroxy stearate, a vinylidene fluoride-based copolymer such as a vinylidene fluoride-hexafluoropropylene copolymer, and organic modified siloxane.

The composite material can contain carbon black, various pigments and dyes. The composite material of the present invention can contain a metallic luster colorant. The composite material of the present invention can also contain an electrical conductivity-imparting component such as electrically conductive carbon black. Further, the composite material of the present invention can also contain a thermal conductivity-imparting component.

The composite material may be crosslinked. Examples of the crosslinking agent include organic peroxide, and specific examples include dicumyl peroxide. The composite material of the present invention may be in a crosslinked form by a silane crosslinking method.

The composite material can be obtained by melt-kneading at least a polyolefin resin, and a cellulose fiber or other supply sources thereof (hereinafter, also collectively referred to as "cellulose fiber material" or "cellulose material" which will be described in detail later). In the kneading, it is also preferable to add a polar solvent having high affinity with the cellulose fiber (for example, water) and perform kneading.

The above kneading is preferably melt-kneading, and typical kneading devices such as a kneader and a twin screw extruder can be applied to the kneading.

Here, "melt-kneading" means kneading at a temperature at which the resin in the raw material is melted. The melt-kneading is preferably performed at a temperature and treatment time at which the cellulose fiber is not deteriorated. The expression "the cellulose fiber is not deteriorated" means that the cellulose fiber does not cause significant discoloration, burning or carbonization.

The temperature in the melt-kneading (temperature of the melt-knead material) is, for example, preferably 110 to 280° C., and more preferably 130 to 220° C. when a case of using a polyethylene resin is taken as an example, from the viewpoint of performing kneading sufficiently while suppressing deterioration of the cellulose fiber. When the resin of the composite material contains a polyolefin resin as a main component and further contains polyethylene terephthalate and/or nylon, melt-kneading can also be performed at the same temperature as the temperature described above.

In the melt-kneading, the used amount of the cellulose material is adjusted so that the content of the cellulose fiber in the obtained composite material is within the above range.

Examples of the cellulose material include a material mainly containing cellulose, and more specifically, examples thereof include pulp, paper, waste paper, paper powder, regenerated pulp, paper sludge, broken paper of laminated paper, and a cellulose fiber-adhering polyolefin thin film piece.

The composite material is, for example, a pellet form, and the layer (A) can be formed by shaping this pellet.

The layer (A) is also preferably in a form of containing foams. In other words, the layer (A) may be a foamed layer having foams due to the action of a foaming agent or a foaming component. When the layer (A) contains foams, the layer (A) is preferably a foamed layer having a low foaming ratio from the viewpoint of mechanical strength. Examples of the foaming agent include an organic or inorganic chemical foaming agent, and specific examples include azodicarbonamide. Examples of the foaming component include moisture adsorbed to a cellulose fiber and a component volatilized from a cellulose fiber at high temperature. Uneven distribution or size of the foam occurs during the foaming in some cases including a case of foaming at a low foaming ratio. The above unevenness of the foam can be reduced by employing a layer (A) in a form of containing aluminum.

When the layer (A) is in a form of containing foams, the layer (A) preferably has a cross section of a foam having a foam diameter of 10 μm or more in cross-sectional observation, and the proportion of the total area of the cross section of the foam in the area of the observed cross section is preferably 5 to 70%. The mechanical strength and light weight of the formed body are both easily achieved by adjusting the proportion to this range.

[Polyolefin Resin Layer (B)]

The layer (B) is a layer containing a polyolefin resin, and is preferably a layer formed of a polyolefin resin. As an example of this polyolefin resin, the polyolefin resins which have been described as the component of the layer (A) can be exemplified. The layer (B) may also contain components other than the polyolefin resin as long as the effects of the present invention are not impaired. The content of the polyolefin resin in the layer (B) is preferably 50% by mass or more, more preferably 60% by mass or more, even more preferably 70% by mass or more, even more preferably 80% by mass or more, and also preferably 90% by mass or more.

The layer (B) preferably contains an inorganic material (preferably, inorganic powder). Flexural modulus, impact resistance, and flame retardancy can be improved by containing the inorganic material. Examples of the inorganic material include calcium carbonate, talc, clay, magnesium oxide, aluminum hydroxide, magnesium hydroxide, and titanium oxide.

The layer (B) may contain at least one type of carbon black, a photostabilizer, and an inorganic powder having a refractive index of 2 or more from the viewpoint of light resistance. Examples of the inorganic powder having a refractive index of 2 or more include titanium oxide.

From the viewpoint of formability, when the layer (B) contains a cellulose fiber, the content of the cellulose fiber in the layer (B) is preferably smaller than the content of the cellulose fiber in the layer (A), and the layer (B) preferably does not contain the cellulose fiber.

From the same point of view, when the layer (B) contains a cellulose fiber, the content of the cellulose fiber having a fiber length of 0.3 mm or more in the layer (B) is preferably smaller than the content of the cellulose fiber having a fiber length of 0.3 mm or more in the layer (A).

In particular, the layer (B) preferably does not contain the cellulose fiber having a fiber length of 0.3 mm or more.

Meanwhile, if the layer (B) contains a cellulose fiber having a short fiber length, the formability is not significantly affected. For example, a form in which the layer (B) contains a fine cellulose fiber having a fiber length of 200 μm or less is preferable as an embodiment of the present invention. In particular, a form in which the layer (B) contains a fine cellulose fiber having a fiber length of 200 μm or less and a fiber diameter of 10 μm or less is preferable as an embodiment of the present invention. Mechanical strength can be improved in a certain level while a good appearance is achieved by containing such a fine cellulose fiber. Moreover, the linear expansion coefficient of the layer (B) can be suppressed by containing this fine cellulose fiber, and thereby a difference in the linear expansion coefficient between the layers (A) and (B) can be minimized.

The layer (B) may contain a flame retardant, an antioxidant, a stabilizer, a weathering agent, a compatibilizer, an impact improver, a modifier, or the like according to the purpose. The composite material of the present invention can contain an oil component or various types of additives for improving processability. Examples thereof include paraffin, modified polyethylene wax, stearate, hydroxy stearate, a vinylidene fluoride-based copolymer such as a vinylidene fluoride-hexafluoropropylene copolymer, and organic modified siloxane.

The layer (B) can also contain carbon black, various pigments and dyes. The composite material of the present invention can contain a metallic luster colorant. The composite material of the present invention can also contain an electrical conductivity-imparting component such as electrically conductive carbon black. Further, the layer (B) can also contain a thermal conductivity-imparting component.

The layer (B) may be crosslinked. Examples of the crosslinking agent include organic peroxide, and specific examples include dicumyl peroxide. The layer (B) may be in a crosslinked form by a silane crosslinking method.

[Laminate]

The laminate of the present invention has at least one layer (A) and at least one layer (B) provided in contact with the layer (A). The laminate of the present invention may be a structure in which the layer (B) is provided on one surface of the layer (A), or is also preferably a form in which the layers (B) are provided on both surfaces of the layer (A). The laminate may also be a structure in which the layers (A) are provided on both surfaces of the layer (B), or may be a multilayer structure in which a plurality of the layers (A) and (B) are stacked. From the viewpoint of appearance and water absorbing properties, at least one of the outermost layers of the laminate is preferably the layer (B), and from the same point of view, both outermost layers of the laminate are also preferably the layer (B).

The laminate of the present invention may be various structures such as a sheet form, on a bulk, on a container, and a tubular form (annular form).

When the laminate of the present invention is an annular structure, for example, the laminate may be a structure in which an annular layer (B) is provided on the outer circumference and/or inner circumference of an annular layer (A) such that the layer (B) is in contact with the layer (A). In other words, the laminate may be a structure in which the annular layer (B) is provided on the outer circumference or inner circumference of the annular layer (A) such that the layer (B) is in contact with the layer (A), or may be a structure in which the annular layers (B) are provided on the outer circumference and inner circumference of the annular layer (A) such that the layers (B) are in contact with the layer (A). When a difference in the linear expansion coefficient between the layers (A) and (B) caused by the layer (A) containing a specific cellulose fiber in a specific amount is large, the laminate is warped. However, when the laminate of the present invention is annular, this warpage is offset by the laminate being a rotational symmetric body. As a result, the linear expansion coefficient of the entire laminate is reduced, whereby stretch and contraction due to temperature change is reduced.

Water absorbing properties can also be suppressed by employing the structure in which the annular layer (B) is provided on the outer circumference and/or inner circumference of the annular layer (A) such that the layer (B) is in contact with the layer (A). In particular, a good appearance can be achieved while suppressing water absorbing properties by employing a structure in which the annular layer (B) is provided on at least the outer circumference of the annular layer (A). For example, only the layer (A) containing a cellulose fiber is extrusion-molded, gum tends to be generated in the die, and the productivity of the formed body is reduced due to removal of this gum. However, the appearance and shape of the formed body are impaired if the gum is not removed. Meanwhile, generation of gum in the outer circumference of the obtained annular structure body can be effectively suppressed by providing the annular layer (B) on at least the outer circumference of the annular layer (A).

The structure in which the annular layers (B) are provided on the outer circumference and inner circumference of the annular layer (A) such that the layers (B) are in contact with the layer (A) is a particularly preferable form from the viewpoint of suppressing water absorbing properties because the water absorption from both the outer circumference side and inner circumference side of the annular structure body can be suppressed. Further, such a structure can improve not only the smoothness of the outer circumference surface of the annular structure body, but also improve the smoothness of the inner surface thereof. Therefore, when such a structure is used as a protective tube for electrical cables, cables, fluid transport rings, and the like, the installation properties of them are also improved.

Further, the laminate of the present invention can be a corrugated tube which is corrugated in the longitudinal direction. In other words, the laminate of the present invention can be a corrugated tube which is corrugated in the longitudinal direction of the tube. The corrugated tube can impart high compressive strength due to its corrugated shape although it is light weight, and also allows stronger bending.

For example, when a typical corrugated tube is provided in a linear manner, the tube is stretched due to temperature change, thus generating waviness or bending which is not intended in the corrugated tube. This is not preferable in appearance. However, the laminate of the present invention, causing less stretch and contraction due to temperature change and having high mechanical strength, can reduce or eliminate the above waviness or bending when this laminate is formed into a corrugated tube.

Also, when the laminate of the present invention is formed into a corrugated tube, water absorbing properties can be suppressed by employing the structure in which the annular layer (B) is provided on the outer circumference and/or inner circumference of the annular layer (A) such that the layer (B) is in contact with the layer (A). In particular, a good appearance can be achieved while suppressing water absorbing properties by employing the structure in which the annular layer (B) is provided on at least the outer circumference of the annular layer (A) such that the layer (B) is in contact with the layer (A).

Also, when the laminate is formed into a corrugated tube, the structure in which the annular layers (B) are provided on the outer circumference and inner circumference of the annular layer (A) is particularly preferable, from the viewpoint of suppressing water absorbing properties because the water absorption from both the outer circumference and inner circumference of the corrugated tube can be suppressed. Such a structure can improve the smoothness of the inner surface of the corrugated tube as well as the appearance of the outer circumference thereof, and thus also improves installation properties when the corrugated tube is used as a protective tube for electrical cables, cables, fluid transport tubes.

When deformation such as bending or compressing is applied in a case where the laminate of the present invention is formed into an annular structure body or a corrugated tube, a significant deformation is applied to the outer circumference and inner circumference of the tube. In order to impart characteristics which withstand this deformation, it is also preferable to provide the annular layers (B) on the outer circumference and inner circumference of the annular layer (A) such that the layers (B) are in contact with the layer (A) and use a polyolefin resin with excellent creep properties and stretch for this layer (B).

In a case where the laminate of the present invention is an annular structure, a form can be taken in which the layer (B) is provided on at least the outer circumference of the layer (A) such that the layer (B) is in contact with the layer (A), and the layer (B) provided on the outer circumference contains at least one type of carbon black, a photostabilizer, an inorganic powder having a refractive index of 2 or more. Light resistance can be efficiently imparted by employing such a form.

In the laminate of the present invention, the linear expansion coefficient in a direction perpendicular to the laminate direction of the laminate is preferably $1 \times 10^{-4}/°$ C. or less. In the present invention, the "linear expansion coefficient" is the average value of linear expansion coefficients in a temperature range of 20 to 30° C. (this average value is also simply referred to as "linear expansion coefficient in a temperature range of 20 to 30° C."). Specifically, the linear expansion coefficient is preferably $1 \times 10^{-4}/°$ C. or less with respect to at least one direction perpendicular to the laminate direction of the laminate. When the laminate is an elongated body which is long in one direction perpendicular to the laminate direction, for example, the linear expansion coefficient in the long-side direction is preferably $1 \times 10^{-4}/°$ C. or less. When the laminate is a formed body formed by extrusion molding, the linear expansion coefficient in the extrusion direction which is one direction perpendicular to the laminate direction of the laminate is preferably $1 \times 10^{-4}/°$ C. or less. Further, when the linear expansion coefficient in a direction perpendicular to the laminate direction of the laminate is adjusted to the above range, the contraction of the laminate during forming is minimized, and at the same time, the stretch and contraction of the laminate in a use environment where the temperature varies (for example, in an environment where there is a temperature difference between the summer and winter, or a temperature difference between day and night) are also reduced. In particular, when the size of the laminate is large or the laminate is long, the linear expansion coefficient is preferably $1 \times 10^{-4}/°$ C. or less. It is possible to adjust the linear expansion coefficient in a direction perpendicular to the laminate direction of the laminate to $1 \times 10^{-4}1°$ C. or less by using a laminate in which the content of the cellulose fiber is 1% by mass or more and less than 60% by mass, and a polyolefin resin layer (A) composed of the composite material in which a cellulose fiber contains a cellulose fiber having a fiber length of 0.3 mm or more and a layer (B) are laminated. The linear expansion coefficient is more preferably $1 \times 10^{-4}/°$ C. or less with respect to two different directions which are perpendicular to the laminate direction of the laminate. In particular, the linear expansion coefficient is even more preferably $1\times10^{-4}/°$ C. or less with respect to two directions which are perpendicular to the laminate direction of the laminate and which are perpendicular to each other.

In the laminate of the present invention, the ratio of the linear expansion coefficient in a temperature range of 20 to 30° C. of the layer (B) to the linear expansion coefficient in a temperature range of 20 to 30° C. of the layer (A) is preferably 1/3 to 3/1 (layer(B)/layer(A)). In other words, the ratio [linear expansion coefficient of layer (B)/linear expansion coefficient of layer (A)] which is the ratio of the linear expansion coefficient of the polyolefin resin layer (B) to the polyolefin resin layer (A) is preferably 1/3 to 3/1. Adjustment to such a ratio prevents generation of warpage and deflection in the production of the laminate and can also suppress generation of warpage and deflection of the laminate caused by temperature difference and the like in a use environment. Also, warpage and deflection are less likely to occur even when the laminate is a sheet form and in a form in which the layer (B) is provided on one side of the layer (A). The ratio of the linear expansion coefficient of the layer (B) to the linear expansion coefficient of the layer (A) is more preferably 1/2 to 2/1, and even more preferably 2/3 to 3/2. In the laminate of the present invention, the layer (B) preferably contains an inorganic material (preferably, an inorganic powder), and the ratio of the linear expansion coefficient of the layer (B) to the linear expansion coefficient of the layer (A) is preferably 1/3 to 3/1 (layer (B)/layer (A)).

In the laminate of the present invention, at least a part of the material constituting the layer (A) and/or layer (B) is preferably derived from a recycled material.

The production method of the laminate of the present invention is not particularly limited, and the laminate can be formed by, for example, extrusion molding, press molding, blow molding, and extrusion blow molding. When the laminate is an elongated body, extrusion molding is preferable. When the laminate of the present invention is formed, the layer (A) and the layer (B) may be formed simultaneously. The laminate can also be formed by forming the layer (A) in advance, and then forming the layer (B) while the layer (B) is simultaneously integrated with the layer (A) (the formation order of the layer (A) and the layer (B) may be reversed). In particular, it is preferable to form respective layers simultaneously.

When a parison was formed upon simultaneous blow molding or extrusion molding of the layers (A) and (B), for example, it becomes possible to form a parison having satisfactory stretch, uniform thickness, and no defects. Also, such simultaneous forming is less likely to cause generation of gum and enables to provide a laminate having a good appearance.

The laminate of the present invention can be used for various applications. The laminate of the present invention is suitable as, for example, various members for civil engineering, building materials, or automobiles.

EXAMPLES

The present invention will be described in more detail based on examples given below, but the invention is not meant to be limited by these. A measurement method and an evaluation method for each indicator in the present invention are as follows.

[Cellulose Content in Composite Material]

A composite material sample (10 mg) which has been dried in advance under the atmosphere at 80° C.×1 hour is subjected to a thermogravimetric analysis (TGA) from 23° C. to 400° C. under a nitrogen atmosphere at a heating rate of +10° C./min. Then, the content of cellulose fiber (% by mass) was calculated by the following [Formula I]. The same five composite material samples were prepared, and the thermogravimetric analysis was performed for each of the composite material samples in the same manner as described above. The average value of five calculated values of the contents (% by mass) of the cellulose fibers was obtained, and the average value was taken as the content (% by mass) of the cellulose fiber.

(content of cellulose fiber [% by mass])=(amount of mass reduction of composite material sample at 200 to 380° C. [mg])×100/(mass of composite material sample in dried state before thermogravimetric analysis [mg])  [Formula I]

[Content of Polyolefin Resin in Composite Material]

The above hot xylene dissolution mass ratio Ga (% by mass) was taken as the content of the polyolefin resin in the composite material. Measurement was performed for five samples similarly to the content of the cellulose fiber, and the average value thereof was taken as Ga.

[Cellulose Fiber Length]

0.1 to 1 g of a composite material shaped in a sheet form was cut out, and used as a sample. This sample was wrapped with a 400-mesh stainless steel mesh, and immersed into 100 mL xylene at 138° C. for 24 hours. Next, the sample was pulled up therefrom, and then the sample was dried in vacuum at 80° C. for 24 hours. Then, 0.1 g of the dry sample was well dispersed into 50 mL of ethanol, added dropwise to a petri dish, and a part in the range of 15 mm×12 mm was observed with a microscope. A case where a cellulose fiber having a fiber length of 0.3 mm or more was observed and a cellulose fiber having a fiber length of 1 mm or more was not observed was evaluated as (o); a case where a cellulose fiber having a fiber length of 0.3 mm or more and a cellulose fiber having a fiber length of 1 mm or more were both observed was evaluated as (0); and other cases were evaluated as (x).

[Length Weighted Average Fiber Length]

The length weighted average fiber length was measured for a hot xylene dissolution residue (insoluble component) of the composite material in accordance with Pulps-Determination of fibre length by automated optical analysis specified by ISO 16065 2001 (JIS P8226 2006). Specifically, 0.1 to 1 g was cut out from a formed sheet of the composite material and taken as a sample, and this sample was wrapped with a 400-mesh stainless steel mesh, and immersed into 100 mL of xylene at 138° C. for 24 hours. Next, the sample was pulled up therefrom, and then the sample was dried in vacuum at 80° C. for 24 hours. Using the hot xylene dissolution residue (insoluble component) of the composite material thus obtained, the length weighted average fiber length was determined by the Pulps-Determination of fibre length by automated optical analysis. MORFI COMPACT, manufactured by TECHPAP was used in this measurement.

[Tensile Strength at Normal Temperature]

A test piece of a laminate was prepared by punching, and the tensile strength was measured for a No. 2 test piece in accordance with JIS-K 7113 1995. A unit is MPa.

[Tensile Elongation at High Temperature]

A test piece was prepared by punching, and the tensile elongation was measured for a No. 2 test piece in accordance with JIS-K 7113 1995. Note that the test temperature was 170° C., and the tensile speed was 500 mm/min. A case where the elongation at break is 100% or more (two times or more) was evaluated as o, and other cases were evaluated as x.

[Water Proofness Indicator]

A laminate shaped in a sheet form was cut out into a sheet with a size of 100 mm×100 mm, and this was immersed into an 80° C. hot water for 20 days. Then, the sheet was taken out from the hot water, and a 40 mm×40 mm square was randomly drawn on the surface of the sheet, and nine line segments of 40 mm were further drawn at 4 mm intervals inside the square. The roughness on an intermediate line between adjacent two line segments was measured under conditions of cut-off value $\lambda c=8.0$ mm and $\lambda s=25.0$ μm by using a surface roughness measuring instrument to obtain ten lines of roughness curves (specified by JIS B 0601; evaluation length: 40 mm). When the number of mountains having a peak top of 30 μm or more and being convex upward (from the surface toward an outside) is counted in all of 10 lines of the roughness curves, a case where the number of mountains is 2 or more in total was evaluated as a nonconformance product (x), and a case where the number of mountains is 0 or 1 was evaluated as a conformance product (○).

[Linear Expansion Coefficient]

The linear expansion coefficient was determined in accordance with JIS K 7197.

A laminate shaped in a sheet form was cut out into a size of 4 mm in width and 10 mm in length to obtain a test piece. The test piece was cut out in a manner that the lengthwise direction of the test piece is aligned with the direction of a roll when a composite material layer is obtained, and the linear expansion coefficient in the roll direction was examined as follows.

A thermomechanical analysis (TMA) was performed by using the obtained test piece by TMA 8310, manufactured by Rigaku Corporation. TMA was performed in a temperature range of −50 to 100° C. with a load of 5 g (49 mN) in a nitrogen atmosphere. The heating rate at this time was 5° C./min. In addition, the temperature of the test piece was once raised to 100° C. before obtaining data to relax strain caused by forming. The average linear expansion coefficient in a temperature range of 20 to 30° C. was determined from a TMA curve obtained.

[Preparation of Resin Sheet-1]

Preparation Example 1

A material obtained by pulverizing broken paper of polyethylene laminated paper (having paper, a polyethylene thin film layer, and an aluminum thin film layer) by using a rotary cutter mill (manufactured by Horai Co., Ltd.) and low density polyethylene 1 (NOVATEC LC600A, manufactured by Japan Polyethylene Corporation) were mixed at the blend ratio (unit: parts by mass) shown in the upper rows in Table 1 and melt-kneaded by using a kneader. In the melt-kneading, 40 parts by mass of water was added. A composite material (moisture content: less than 1% by mass) was thus obtained.

The composite material was formed into a sheet form by a roll, and further pressed to obtain the composite material sheet of Preparation Example 1.

Preparation Example 2

The composite material sheet of Preparation Example 2 was obtained in the same manner as in Preparation Example 1 except that the composite material (moisture content: less than 1% by mass) was obtained by changing the blend ratio of low density polyethylene 1 and broken paper of polyethylene laminated paper to the blend ratio as shown in the upper rows in Table 1.

Preparation Example 3

The resin sheet of Preparation Example 3 was obtained by using low density polyethylene 1.

Preparation Example 4

The resin sheet of Preparation Example 4 was obtained by using high density polyethylene 1 (MFR: 0.1 g/10 min (190° C., 21.18 N)).

Information about the resin sheets of Preparation Examples 1 to 4 are shown in the following Table 1.

TABLE 1

|  | PEx. 1 | PEx. 2 | PEx. 3 | PEx. 4 |
|---|---|---|---|---|
| Low density polyethylene 1 (parts by mass) | 60 | 90 | 100 |  |
| Broken paper of laminate paper (parts by mass) | 40 | 10 |  |  |
| High density polyethylene 1 (parts by mass) |  |  |  | 100 |
| Cellulose fiber (% by mass) | 19.8 | 4.7 | — | — |
| Polyolefin resin (% by mass) | 73.1 | 93.4 | — | — |
| Aluminum, ash (% by mass) | 7.1 | 1.9 | — | — |
| Cellulose fiber length | ⊙ | ⊙ | — | — |

Remarks:
'PEx.' means Preparation Example.

In the sheets of Preparation Examples 1 and 2, the length weighted average fiber length of the cellulose fiber measured in accordance with Pulps-Determination of fibre length by automated optical analysis was 300 to 10,000 μm. Specifically, the length weighted average fiber length was 733 μm in Preparation Example 1, and 716 μm in Preparation Example 2. In this measurement, the percentage of the number of fibers having a fiber length of 0.3 mm or more, weighted with length was 70% or more. Further, the average fiber diameter was 10 to 30 μm in both examples. Specifically, the average fiber diameter was 22 μm in both Preparation Examples 1 and 2.

[Production of Laminate-1]

Example 1

The sheets obtained in Preparation Example 4 as an outer layer were disposed on the both surfaces of the sheet obtained in Preparation Example 1 as an intermediate layer with the thicknesses shown in Table 2, and the sheets were then pressed to obtain a sheet having a three-layer structure.

Example 2

A sheet having a three-layer structure was obtained in the same manner as in Example 1 except that the sheet obtained in Preparation Example 2 was used in place of the sheet obtained in Preparation Example 1.

Comparative Example 1

A sheet having a three-layer structure was obtained in the same manner as in Example 1 except that the sheet obtained in Preparation Example 3 was used in place of the sheet obtained in Preparation Example 1.

Examples 3 and 5

Sheets having a three-layer structure were each obtained in the same manner as in Example 1 except that the thicknesses of the sheets were changed as shown in Table 2.

Examples 4 and 6

Sheets having a three-layer structure were each obtained in the same manner as in Example 2 except that the thicknesses of the sheets were changed as shown in Table 2.

Comparative Examples 2 and 3

Sheets having a three-layer structure were each obtained in the same manner as in Comparative Example 1 except that the thicknesses of the sheets were changed as shown in Table 2.

Comparative Examples 4 to 6

2 mm-thick sheets of single layers of Preparation Examples 1 to 3 were each prepared.

The results are shown the following tables.

is aligned with the roll direction when the sheet of the intermediate layer (composite material layer containing a cellulose fiber, Preparation Example 1) was obtained. The linear expansion coefficient was $4.8 \times 10^{-5}/°$ C. Further, the cross section of the sheet of Example 1 was observed, and a folded structure in which an aluminum thin film is folded was observed in the intermediate layer.

[Preparation of Resin Sheet-2]

Preparation Example 5

Low density polyethylene 1 (NOVATEC LC600A, manufactured by Japan Polyethylene Corporation) and cellulose 1 (KC Flock, manufactured by Nippon Paper Industries Co., Ltd.) were mixed at the blend ratio shown in the upper rows in Table 4 (unit: parts by mass) and melt-kneaded by using a kneader. In the melt-kneading, 30 parts by mass of water was added. A composite material (moisture content: less than 1% by mass) was thus obtained.

The composite material was formed into a sheet form by a roll, and further pressed to obtain the composite material sheet of Preparation Example 5.

TABLE 2

|  | Ex. 1 | Ex. 2 | CEx. 1 | Ex. 3 | Ex. 4 | CEx. 2 | Ex. 5 | Ex. 6 | CEx. 3 |
|---|---|---|---|---|---|---|---|---|---|
| Intermediate layer | PEx. 1 | PEx. 2 | PEx. 3 | PEx. 1 | PEx. 2 | PEx. 3 | PEx. 1 | PEx. 2 | PEx. 3 |
| Outer layer | PEx. 4 | PEx. 4 | PEx. 4 | PEx. 4 | PEx. 4 | PEx. 4 | PEx. 4 | PEx. 4 | PEx. 4 |
| Intermediate layer thickness (mm) | 1.4 | 1.4 | 1.4 | 1.0 | 1.0 | 1.0 | 0.6 | 0.6 | 0.6 |
| Outer layer thickness (mm) | 0.3 | 0.3 | 0.3 | 0.5 | 0.5 | 0.5 | 0.7 | 0.7 | 0.7 |
| Tensile strength at normal temperature (MPa) | 29.2 | 16.3 | 15.7 | 29.7 | 19.7 | 15.0 | 28.3 | 21.9 | 16.1 |
| Tensile elongation at high temperature | ○ | ○ | ○ | ○ | ○ | ○ | ○ | ○ | ○ |
| Water proofness indicator | ○ | ○ | ○ | ○ | ○ | ○ | ○ | ○ | ○ |

Remarks 'Ex.' means Example according to this invention, 'CEx.' means Comparative Example, and 'PEx.' means Preparation Example.

TABLE 3

|  | CEx. 4 | CEx. 5 | CEx. 6 |
|---|---|---|---|
| Single layer | PEx. 1 | PEx. 2 | PEx. 3 |
| Single layer thickness (mm) | 2.0 | 2.0 | 2.0 |
| Tensile strength at normal temperature (MPa) | 22.4 | 15.4 | 13.1 |
| Tensile elongation at high temperature (%) | x | x | ○ |
| Water proofness indicator | x | x | ○ |

Remarks:
'CEx.' means Comparative Example, and 'PEx.' means Preparation Example.

The sheets of Examples 1 to 6, which have resin layers on the both surfaces of a composite material layer containing a cellulose fiber having a predetermined fiber length, exhibited high tensile elongation at high temperature and excellent tensile strength at normal temperature. Further, the results show that the unevenness of the surface caused by the cellulose fiber is not noticeable and the water proofness was excellent. When the tensile elongation at high temperature is high, the stretch of the parison during simultaneous forming is satisfactory in the formation of a laminate having an annular structure, for example. Therefore, it becomes possible to form a thick and uniform parison with no defects. Further, the linear expansion coefficient for the sheet having a three-layer structure of Example 1 was measured in a manner that the lengthwise direction of a test piece cut out

TABLE 4

|  | Preparation Example 5 |
|---|---|
| Low density polyethylene 1 (parts by mass) | 70 |
| Cellulose 1 (parts by mass) | 30 |
| Cellulose fiber (% by mass) | 23.1 |
| Polyolefin resin (% by mass) | 73.7 |
| Ash and others (% by mass) | 3.2 |
| Cellulose fiber length | x |

[Production of Laminate-2]

Comparative Example 7

A sheet having a three-layer structure was obtained in the same manner as in Example 1 except that the composite material sheet obtained in Preparation Example 5 was used in place of the composite material sheet obtained in Preparation Example 1.

TABLE 5

|  | Comparative Example 7 |
|---|---|
| Intermediate layer | Preparation Example 5 |
| Outer layer | Preparation Example 4 |

TABLE 5-continued

| | Comparative Example 7 |
|---|---|
| Intermediate layer thickness (mm) | 1.4 |
| Outer layer thickness (mm) | 0.3 |
| Tensile strength at normal temperature (MPa) | 15.6 |
| Tensile elongation at high temperature | ◯ |
| Water proofness indicator | ◯ |

When the fiber length of the cellulose fiber of the layer (A) was shorter than the definition of the present invention, a desired mechanical strength could not be obtained.

[Preparation of Resin Pellet-3]

Preparation Example 6

A material obtained by pulverizing broken paper of polyethylene laminated paper (having paper, a polyethylene thin film layer, and an aluminum thin film layer) by using a rotary cutter mill (manufactured by Horai Co., Ltd.) and low density polyethylene 1 (NOVATEC LC600A, manufactured by Japan Polyethylene Corporation) were mixed at the blend ratio (unit: parts by mass) shown in the upper rows in Table 6 and melt-kneaded by using a kneader. In the melt-kneading, 20 parts by mass of water was added. A composite material (moisture content: less than 1% by mass) was thus obtained.

The composite material was passed through an extruder to form pellets, thus obtaining the composite material pellet of Preparation Example 6.

TABLE 6

| | Preparation Example 6 |
|---|---|
| Low density polyethylene 1 (parts by mass) | 80 |
| Broken paper of laminate paper (parts by mass) | 20 |
| Cellulose fiber (% by mass) | 10.1 |
| Polyolefin resin (% by mass) | 86.3 |
| Aluminum, ash (% by mass) | 3.6 |
| Cellulose fiber length | ⊙ |

Preparation Example 7

A cellulose fiber-aluminum-adhering polyethylene thin film piece (Cel-Al-adhering PE thin film piece) was obtained by stirring a recovered beverage container formed of polyethylene laminated paper having paper, a polyethylene thin film layer, and an aluminum thin film layer, in water by a pulper, to strip off and remove a paper portion to some extent from the recovered beverage container. This thin film piece was cut into small pieces having various shapes and sizes of about several cm² to 100 cm², and was in a wet state (moisture content: 30%) by being immersed into water in a step of stripping off the paper portion. The polyethylene constituting this Cel-Al-adhering PE thin film piece is a low density polyethylene. Then, the Cel-Al-adhering PE thin film piece was charged into a kneader, and melt-kneaded to obtain a resin composite material (moisture content: 1% by mass or less). This composite material was passed through an extruder to form pellets, thus obtaining the composite material pellet of Preparation Example 7.

TABLE 7

| | Preparation Example 7 |
|---|---|
| Cel-Al-adhering PE thin film piece (parts by mass) | 100 |
| Cellulose fiber (% by mass) | 18.1 |

TABLE 7-continued

| | Preparation Example 7 |
|---|---|
| Polyolefin resin (% by mass) | 76.1 |
| Aluminum, ash (% by mass) | 5.8 |
| Cellulose fiber length | ⊙ |

Preparation Example 8

A material obtained by pulverizing broken paper of polyethylene laminated paper (having paper, a polyethylene thin film layer, and an aluminum thin film layer) by using a rotary cutter mill (manufactured by Horai Co., Ltd.) and low density polyethylene 1 (NOVATEC LC600A, manufactured by Japan Polyethylene Corporation), and zinc stearate as a metal salt of organic acid were mixed at a blend ratio of 78:20:2 (unit: parts by mass) and melt-kneaded by using a kneader. In the melt-kneading, 20 parts by mass of water was added. A composite material (moisture content: less than 1% by mass) was thus obtained. In the composite material, the cellulose fiber amount was 10.4% by mass, and the amount of aluminum/ash was 3.5%. The evaluation of the fiber length of this composite material was ⊙. The composite material was passed through an extruder to form pellets, thus obtaining the composite material pellet of Preparation Example 8.

In the composite materials of Preparation Examples 6, 7, and 8, the length weighted average fiber length of the cellulose fiber measured in accordance with Pulps-Determination of fibre length by automated optical analysis was 300 to 10,000 µm. Specifically, the length weighted average fiber length was 725 µm in Preparation Example 6, and 521 µm in Preparation Example 7. In this measurement, the percentage of the number of fibers having a fiber length of 0.3 mm or more, weighted with length was 70% or more in these examples. Further, the average fiber diameter was 10 to 30 µm in these examples. Specifically, the average fiber diameter was 22 µm in Preparation Example 6, 19 µm in Preparation Example 7, and 23 µm in Preparation Example 8.

[Production of Laminate-3]

Example 7

A corrugated annular laminate having a two-layer structure and including an inner layer formed of the composite material of Preparation Example 6 and an outer layer formed of the high density polyethylene 1 (MFR: 0.3 g/min) disposed on the outer circumference of the inner layer was prepared. The inner layer and the outer layer were simultaneously extruded. A two-layer parison extruded in an annular shape was expanded against the inner surface of a mold having a corrugated shape on the outer circumference of the mold, thus imparting a corrugated shape to the parison. The expansion of the parison was performed by suctioning due to a negative pressure through a plurality of small holes provided in the mold. A corrugated tube having a two-layer structure (inner diameter: 100 mm) was thus prepared. The thickness ratio of the outer layer and the inner layer was 0.25:0.75. The average thickness of the entire layer was 2.7 mm.

Example 8

A corrugated annular laminate having a three-layer structure and including an intermediate layer formed of the composite material of Preparation Example 6, and an inner layer and an outer layer, which are formed of a resin material formed by adding a carbon masterbatch to high density polyethylene 1 (MFR: 0.3 g/min) and disposed on the both surfaces of the outer circumference and inner circumference of the intermediate layer, was prepared (the composite material of Preparation Example 6 was dried in advance). The intermediate layer, the inner layer, and the outer layer were simultaneously extruded. A three-layer parison extruded in an annular shape was expanded against the inner surface of a mold having a corrugated shape on the outer circumference of the mold, thus imparting a corrugated shape to the parison. The expansion of the parison was performed by suctioning due to a negative pressure through a plurality of small holes provided in the mold. A corrugated tube having a three-layer structure (inner diameter: 100 mm) was thus prepared. The thickness ratio of the outer layer, the intermediate layer, and the inner layer was 0.2:0.6:0.2. The average thickness of the entire layer was 2.8 mm.

Example 9

A corrugated tube having a three-layer structure was prepared in the same manner as in Example 8 except that the composite material of Preparation Example 7 was used in place of the composite material of Preparation Example 6.

Example 10

A corrugated tube having a two-layer structure was prepared in the same manner as in Example 7 except that the composite material of Preparation Example 8 was used in place of the composite material of Preparation Example 6.

Comparative Example 8

A corrugated annular body having a single layer structure formed of the composite material of Preparation Example 6 (thickness: 2.7 mm) was prepared. In other words, a corrugated tube having a single layer structure was prepared by imparting a corrugated shape to a single-layered parison extruded in an annular shape, in the same manner as in Example 7.

The formability, gum, and appearance were evaluated for the obtained laminate having an annular structure. As a result, the annular laminate of Comparative Example 8, in which a polyolefin resin composite material formed by dispersing a cellulose fiber containing a cellulose fiber having a fiber length of 0.3 mm or more was formed into a single layer, resulted in poor stretch of the parison, unstable thickness, and inferior formability, and the obtained annular laminate was interior in appearance. Further, generation of gum was significant, and further deterioration of appearance was observed.

Meanwhile, the annular laminate having a two-layer structure of Example 7, which includes an inner layer formed of a polyolefin resin composite material formed by dispersing a cellulose fiber containing a cellulose fiber having a fiber length of 0.3 mm or more, and further includes a polyolefin resin layer disposed on the outer circumference of the inner layer, resulted in satisfactory stretch of the parison, excellent formability, and reduced generation of gum, and thus exhibited good appearance.

Also, the annular laminate having a two-layer structure of Example 10, which includes an inner layer formed of a polyolefin resin composite material formed by dispersing a cellulose fiber containing a cellulose fiber having a fiber length of 0.3 mm or more and containing a metal salt of organic acid, and includes a polyolefin resin layer disposed on the outer circumference of the inner layer, resulted in satisfactory stretch of the parison, excellent formability, and reduced generation of gum, and thus exhibited good appearance. Further, in Example 10, the smoothness of the inner circumference surface was higher than Example 7, and forming with increased extrusion amount and increased speed was possible.

Further, the annular laminates of Examples 8 and 9, which include an intermediate layer formed of a polyolefin resin composite material formed by dispersing a cellulose fiber containing a cellulose fiber having a fiber length of 0.3 mm or more, and further include polyolefin resin layers disposed on the outer circumference and inner circumference of the intermediate layer, resulted in satisfactory stretch of the parison, excellent formability, and reduced generation of gum, and thus exhibited good appearance. Moreover, the smoothness of the inner circumference surface was outstandingly high.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A laminate, comprising two or more polyolefin resin layers,
wherein at least one polyolefin resin layer (A) comprises a cellulose fiber including a cellulose fiber having a fiber length of 0.3 mm to 10 mm dispersed in the layer; a content of the cellulose fiber in the polyolefin resin layer (A) is 1% by mass or more and less than 60% by mass;
wherein a polyolefin resin layer (B) different from the polyolefin resin layer (A) is laminated in contact with the polyolefin resin layer (A); and
wherein at least one of a polyolefin constituting the polyolefin resin layer (A) and a polyolefin constituting the polyolefin resin layer (B) consists of polyethylene.

2. The laminate according to claim 1, wherein the polyolefin resin layer (A) comprises dispersed aluminum.

3. The laminate according to claim 2, wherein the aluminum has a flake structure and/or an irregular folded structure of a thin film.

4. The laminate according to claim 1, which has a linear expansion coefficient of $1\times10^{-4}/°$ C. or less in a temperature range of 20 to 30° C. in a direction perpendicular to a laminate direction of the laminate.

5. The laminate according to claim 1, wherein a polyolefin constituting the polyolefin resin layer (A) comprises a low density polyethylene and/or a polyolefin having a melting point of 100 to 127° C.

6. The laminate according to claim 1, wherein a polyolefin resin constituting the polyolefin resin layer (B) comprises a high density polyethylene resin.

7. The laminate according to claim 1, wherein the polyolefin resin layer (B) comprises an inorganic material.

8. The laminate according to claim 7, wherein a ratio of a linear expansion coefficient in a temperature range of 20 to 30° C. of the polyolefin resin layer (B) to a linear expansion coefficient in a temperature range of 20 to 30° C. of the polyolefin resin layer (A) is 1/3 to 3/1.

9. The laminate according to claim 1, wherein the polyolefin resin layer (A) comprises at least one type of compound selected from a metal salt of organic acid, organic acid, and silicone.

10. The laminate according to claim 1, wherein the polyolefin resin layer (A) comprises an inorganic material.

11. The laminate according to claim 1, comprising the polyolefin resin layers (B) on both surfaces of the polyolefin resin layer (A), the polyolefin resin layers (B) being in contact with the polyolefin resin layer (A).

12. The laminate according to claim 1,
wherein the laminate is an annular structure; and
wherein the laminate comprises the polyolefin resin layer (B) on an outer circumference and/or an inner circumference of the polyolefin resin layer (A) having an annular shape, the polyolefin resin layer (B) being in contact with the polyolefin resin layer (A).

13. The laminate according to claim 11,
wherein the laminate is an annular structure; and
wherein the laminate comprises the polyolefin resin layers (B) on an outer circumference and an inner circumference of the polyolefin resin layer (A) having an annular shape, the polyolefin resin layers (B) being in contact with the polyolefin resin layer (A).

14. The laminate according to claim 1,
wherein the laminate is an annular structure;
wherein the laminate comprises the polyolefin resin layer (B) on at least an outer circumference of the polyolefin resin layer (A) having an annular shape, the polyolefin resin layer (B) being in contact with the polyolefin resin layer (A); and
wherein the polyolefin resin layer (B) comprises at least one type of carbon black, a photostabilizer, and an inorganic powder having a refractive index of 2 or more.

15. The laminate according to claim 12, wherein the laminate having an annular structure is a corrugated tube which is corrugated in a longitudinal direction.

16. The laminate according to claim 1, wherein the laminate is an extrusion molded body or a blow molded body.

17. The laminate according to claim 1,
wherein the polyolefin resin layer (A) has a cross section of a foam having a foam diameter of 10 μm or more in cross-sectional observation of the polyolefin resin layer (A); and wherein a proportion of a total area of the cross section of the foam in an area of an observed cross section is 5 to 70%.

18. The laminate according to claim 1, wherein a length weighted average fiber length of the cellulose fiber contained in the polyolefin resin layer (A) is 300 to 10,000 μm.

19. The laminate according to claim 1, which is used as a member for civil engineering, a building material, or an automobile.

* * * * *